(12) United States Patent
Wang et al.

(10) Patent No.: US 10,139,555 B2
(45) Date of Patent: Nov. 27, 2018

(54) BACKLIGHT MODULE AND DISPLAY DEVICE

(71) Applicants: BOE TECHNOLOGY GROUP CO., LTD., Beijing (CN); HEFEI BOE DISPLAY LIGHTING CO., LTD., Anhui (CN)

(72) Inventors: Xing Wang, Beijing (CN); Qiping Zhang, Beijing (CN); Yanfeng Li, Beijing (CN); Wenbo Sun, Beijing (CN); Tongmin Liu, Beijing (CN)

(73) Assignees: BOE TECHNOLOGY GROUP CO., LTD., Beijing (CN); HEFEI BOE DISPLAY LIGHT CO., LTD., Anhui (CN)

( * ) Notice: Subject to any disclaimer, the term of this patent is extended or adjusted under 35 U.S.C. 154(b) by 0 days.

(21) Appl. No.: 15/309,150

(22) PCT Filed: Feb. 1, 2016

(86) PCT No.: PCT/CN2016/073040
§ 371 (c)(1),
(2) Date: Nov. 4, 2016

(87) PCT Pub. No.: WO2017/045336
PCT Pub. Date: Mar. 23, 2017

(65) Prior Publication Data
US 2017/0269291 A1   Sep. 21, 2017

(30) Foreign Application Priority Data
Sep. 18, 2015   (CN) .......................... 2015 1 0600854

(51) Int. Cl.
*F21V 7/04*   (2006.01)
*F21V 8/00*   (2006.01)
(Continued)

(52) U.S. Cl.
CPC ..... *G02B 6/0088* (2013.01); *G02F 1/133608* (2013.01); *F21V 17/164* (2013.01); *F21V 21/088* (2013.01)

(58) Field of Classification Search
CPC . G02B 6/0088; G02F 1/133608; F21V 15/01; F21V 17/14; F21V 17/16;
(Continued)

(56) References Cited

U.S. PATENT DOCUMENTS 7,679,694 B2 *   3/2010   Shirai ............... G02F 1/133308
                                                        362/632
2005/0185397 A1   8/2005   Chu
(Continued)

FOREIGN PATENT DOCUMENTS

CN   1493900 A   5/2004
CN   101146420 B   9/2010
(Continued)

OTHER PUBLICATIONS

First Office Action for Chinese Application No. 201510600854.8, dated Jul. 10, 2017, 6 Pages.
(Continued)

*Primary Examiner* — Y M. Lee
(74) *Attorney, Agent, or Firm* — Brooks Kushman P.C.

(57) ABSTRACT

The present disclosure provides a backlight module and a display device. The backlight module includes a back plate comprising a base plate and at least one side wall defining an accommodation space, a frame, at least a portion of which is accommodated in the space. The frame comprises at least one side surface arranged opposite to the side wall. Clamping hooks are arranged on the side surface, and matching parts are arranged on the side wall and correspond with the clamping hooks. The clamping hook comprises a first portion connected to the side surface and a second portion
(Continued)

formed by bending and extending the first portion. The matching part comprises a hook hole portion and a retainer portion arranged around the hook hole portion. The first portion may be inserted into the hook hole portion, and the second portion is clamped by and fixed with the retainer portion.

16 Claims, 7 Drawing Sheets

(51) Int. Cl.
*G02F 1/1335* (2006.01)
*F21V 17/16* (2006.01)
*F21V 21/088* (2006.01)

(58) Field of Classification Search
CPC ...... F21V 17/164; F21V 21/088; F21V 21/30; F21V 21/08
See application file for complete search history.

(56) References Cited

U.S. PATENT DOCUMENTS

2008/0062663 A1 3/2008 Tsuo
2009/0185097 A1* 7/2009 Kim .................. G02F 1/133608
  362/633
2016/0091656 A1* 3/2016 Que ..................... G02B 6/0088
  362/382

FOREIGN PATENT DOCUMENTS

| CN | 102355566 A | 2/2012 |
| CN | 103256523 A | 8/2013 |
| CN | 102818228 B | 6/2014 |
| CN | 104267522 A | 1/2015 |
| CN | 204272282 U | 4/2015 |
| CN | 105068318 A | 11/2015 |

OTHER PUBLICATIONS

International Search Report and Written Opinion for Application No. PCT/CN2016/073040, dated Jun. 15, 2016, 10 Pages.
Second Office Action for Chinese Application No. 201510600854.8, dated Nov. 14, 2017, 3 Pages.

* cited by examiner

BACKLIGHT MODULE AND DISPLAY DEVICE

CROSS-REFERENCE TO RELATED APPLICATIONS

This application is the U.S. national phase of PCT Application No. PCT/CN2016/073040 filed on Feb. 1, 2016, which claims priority to Chinese Patent Application No. 201510600854.8 filed on Sep. 18, 2015, the disclosures of which are incorporated in their entirety by reference herein.

TECHNICAL FIELD

The present disclosure relates a field of display technique, and specifically relates to a backlight module and a display device.

BACKGROUND

With development trends of thin-shapes and high percentage of display front that is screen and not bezel of liquid crystal display products, requirements for display qualities of the display products by the market are higher and higher. This means that a quality of a Back Light Unit (BLU) of a liquid crystal screen should be further improved. Recently, more and more liquid crystal displays for mobile phones, tablet computers, notebook computers and so on are demanded by the market, and thus an amount of the required backlight modules used for the liquid crystal displays increases therewith year by year.

FIG. 1 is an overall exterior schematic diagram of a clamping structure for a back plate and a frame in a medium or small size backlight module in the related arts; and FIG. 2 is a partial sectional schematic diagram of the clamping structure for the back plate and the frame in the medium or small size backlight module in the related arts.

As shown in FIGS. 1-2, when assembling a backlight module in the related arts, a reflective plate 3 is arranged inside an interior cavity of a back plate 1, and then a light-guide plate 4 is arranged on the reflective plate 3 by means of fastening adhesive tapes, and finally the back plate 1 and a frame 2 are joined together by a clamping structure (i.e. the portion 'B' shown in FIG. 2) for the back plate 1 and the frame 2, and a portion of the light-guide plate 4 is arranged under the frame 2. The clamping structure for the back plate 1 and the frame 2 is shown in FIG. 1 and FIG. 2, wherein an opening 10 is arranged in the back plate 1, and a protrusion 20 is arranged on the frame 2 and made of a plastic material. When assembling, the protrusion 20 deforms itself by pressure from the opening 10, and returns to its original shape after being plugged into the opening, thereby implementing a tight clamping with the opening 10.

However, in the process of assembling the backlight module in such a manner, it is very time-consuming and laborious with such clamping structure, and thus in low assembling efficiency, and the workers are prone to fell fatigue as they assemble the backlight modules. Further, in the process of repairing the backlight module, disassembling the clamping structures for the frame and the back plate, the number of which is usually about 13 to 15, are very complicated, and during disassembling, deformation of the display caused by thin thickness of the frame or softness of a material of the back plate (such as aluminum back plate) frequently occurs, and such loss during repairing is not negligible. Additionally, the above clamping structures implement the clamping by deforming the protrusions on the frame through pressing, and thus fragments of the frame are likely to be generated. In addition, during the process of manufacturing or shipping the display products, the clamping structures may escape from the clamping state due to slight external forces, i.e., a 'clamping-escape'. When one or more of the clamping structures of the display escape from the clamping state, a local bump might arise on a support surface of the frame 2 for the display screen, and thus the display screen is likely to be broken, which may be serious loss.

SUMMARY

An object of the present disclosure is to provide a backlight module and a display device with a practical structure which is easy to be manufactured, so as to prevent a phenomenon of clamping-escape from happening, and thus improve the efficiency of assembling and repairing the display products.

In one aspect, the present disclosure provides in some embodiments a backlight module including: a back plate including a base plate and at least one side wall, wherein an accommodation space is defined by the base plate and the side wall; a frame, at least a portion of which is accommodated in the accommodation space defined by the base plate and the side wall, wherein the frame includes at least one side surface arranged opposite to the at least one side wall of the back plate. A plurality of clamping hooks is arranged on the side surfaces of the frame, and a plurality of matching parts is arranged on the side wall of the back plate and in one-to-one correspondence with the plurality of clamping hooks; each of the clamping hooks includes a first portion connected to the side surface of the frame and a second portion formed by bending and extending the first portion, and each of the matching parts includes a hook hole portion and a retainer portion arranged around the hook hole portion; the first portion of each clamping hook is capable of being inserted into the hook hole portion of the corresponding matching part, such that the second portion of the clamping hook is clamped by and fixed with the retainer portion of the corresponding matching part.

Further, the second portions of the clamping hooks on a same side surface of the frame have a same bending and extending direction; and in the matching parts on the same side wall of the back plate, the retainer portions are arranged at locations that are at a same side of the respective hook hole portions, and correspond to respective locations of the second portions of corresponding clamping hooks.

Further, the back plate includes a first sidewall, a second sidewall arranged opposite to the first sidewall, and a third sidewall connected between the first sidewall and the second sidewall. The frame includes a first side surface arranged opposite to the first sidewall, a second side surface arranged opposite to the second sidewall, and a third side surface arranged opposite to the third sidewall. The second portions of the clamping hooks on the first side surface and the second side surface are in a bending and extending direction away from the third side surface, and the second portions of the clamping hooks on the third side surface are in a bending and extending direction towards the first side surface or the second side surface.

Further, each of the retainer portions includes a first retainer arranged parallel to a side surface of the frame, and a second retainer arranged vertical to the side surface of the frame and parallel to the extending direction of the second portion of the corresponding clamping hook. The first retainer is arranged between the second portion of the corresponding clamping hook and the side surface of the frame, and configured to position the corresponding clamping hook in the extending direction of the second portion and in a direction vertical to the side surface of the frame. The second retainer is arranged on a side of the second portion of the corresponding clamping hook that is close to or away from the base plate of the back plate, and configured to position the corresponding clamping hook in a direction vertical to the base plate.

Further, each of the matching parts is of a groove structure formed by stamping the sidewall of the back plate, and the groove structure is depressed in a direction towards the frame and includes a groove bottom and a groove wall, wherein the first retainer is defined by the groove bottom, and the second retainer is defined by the groove wall, and the hook hole portion is arranged at the groove bottom.

Further, there is a predetermined distance between the second portion of each clamping hook and the side surface of the frame, and the predetermined distance is greater than a thickness of the first retainer of the corresponding matching part.

Further, the first portion of each of the clamping hooks is movable within the hook hole portion of the corresponding matching part in the extending direction of the second portion of the clamping hook, such that in the case of assembling the back plate and the frame, the first portion of the clamping hook moves within the hook hole portion after being inserted into the hook hole portion, enabling the second portion to be clamped by and fixed with the retainer portion.

Further, each of the clamping hooks is of an L-shaped structure formed by bending and extending the first portion to form the second portion.

Further, the clamping hooks and the frame is of an integral structure

In another aspect, the present disclosure provides a display module including the above backlight modules.

The present disclosure provides the backlight module with the clamping structure for the back plate and the frame in which the clamping hook is clamped with the matching part, as compared with clamping structure for the back plate and the frame in the related arts, the clamping structure of the present disclosure is easy to be manufactured and practical, so as to prevent the phenomenon of clamping-escape from happening, and thus improve the efficiency of assembling and repairing the display products.

DETAILED DESCRIPTION

The principles and features of the present disclosure will be described hereinafter with respect to the figures, and the following embodiments are only used to explain the present disclosure, but not used to limit the scope of the present disclosure.

In order to solve the technical problems in the related arts that when assembling the backlight module, the clamping assembling manner utilized for the back plate and the frame may cause to generate fragments, the assembling process is troublesome, the assembling efficiency is low, and the phenomenon of clamping-escape is likely to occur, the present disclosure provides a backlight module with a practical structure which is easy to be manufactured, so as to prevent a phenomenon of clamping-escape from happening, and thus improve the efficiency of assembling and repairing the display products.

Figure 7:
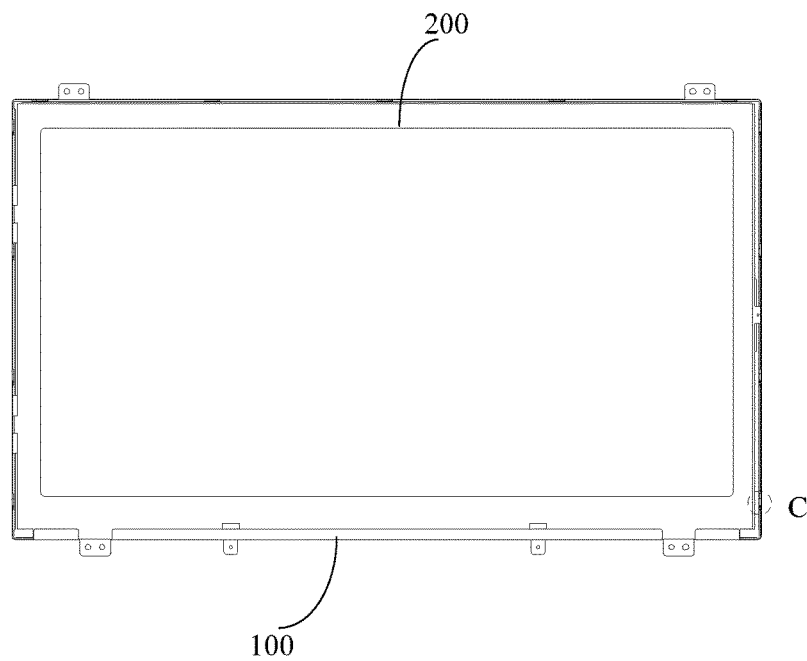
FIG. 7 is a schematic diagram of an overall structure assembled by the back plate and the frame in the backlight module provided in the embodiments of the present disclosure.
Figure 8:
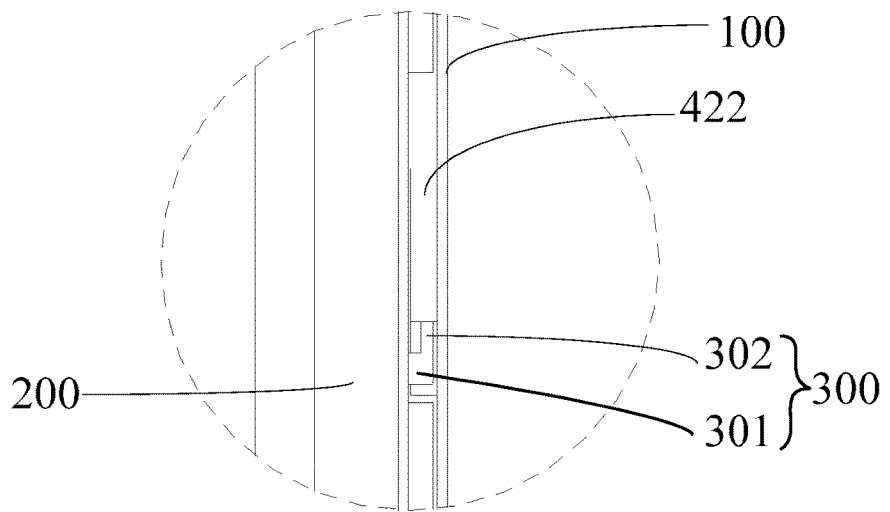
FIG. 8 is an enlarged schematic diagram of a "C" portion of the clamping structure in FIG. 7.
Figure 9:
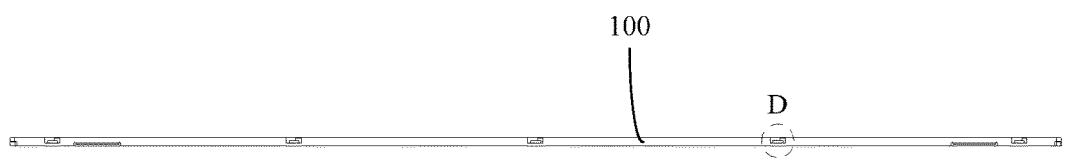
FIG. 9 is a side view of the overall structure in FIG. 7.

As shown in FIG. 7, the backlight module provided in at least some of the embodiments of the present disclosure includes a back plate 100 and a frame 200.

Figure 1:
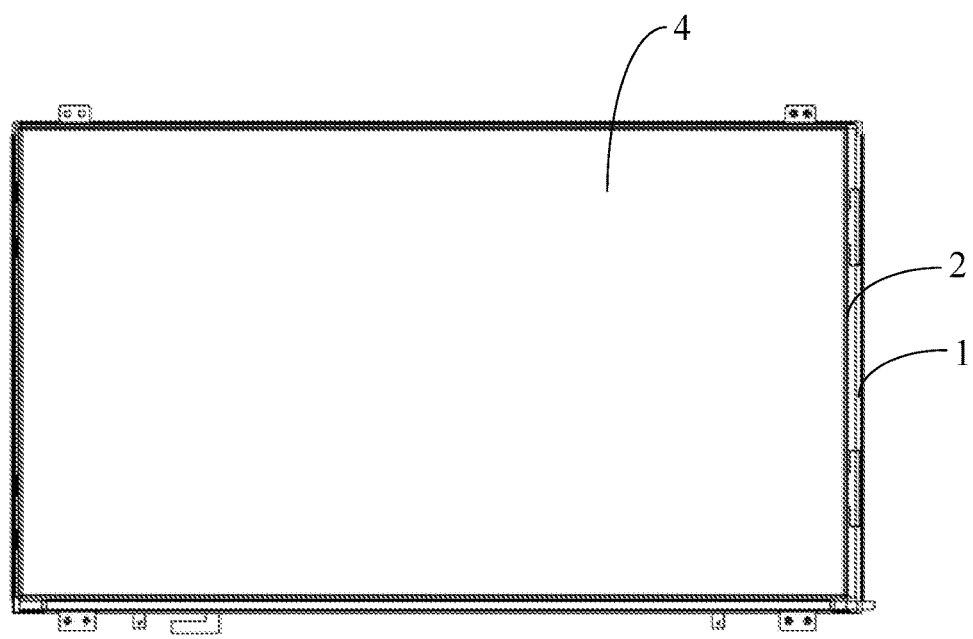
FIG. 1 is a schematic diagram of an overall structure assembled by a back plate and a frame of a medium or small size backlight module in the related arts.
Figure 2:
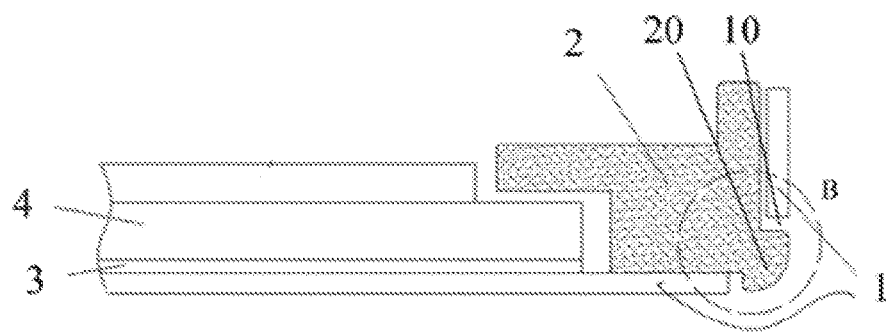
FIG. 2 is a partial sectional schematic diagram of a clamping structure for the back plate and the frame of the medium or small size backlight module in the related arts.
Figure 3:
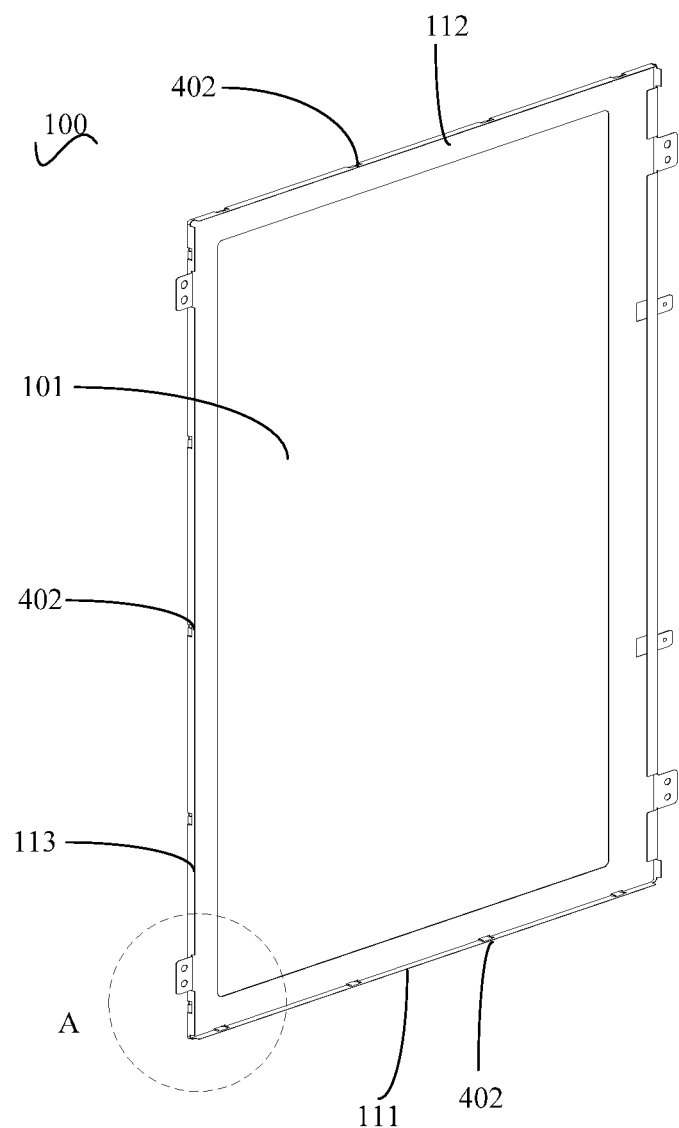
FIG. 3 is a schematic diagram of an overall structure of a back plate in a backlight module provided in the embodiments of the present disclosure.

FIG. 3 is a three-dimensional structural schematic diagram of the back plate 100 in the backlight module provided in the embodiments of the present disclosure. The back plate 100 includes a base plate 101 and at least one side wall (not shown in FIG. 3), and the base plate 10 and the side wall define an accommodation space together.

Figure 5:
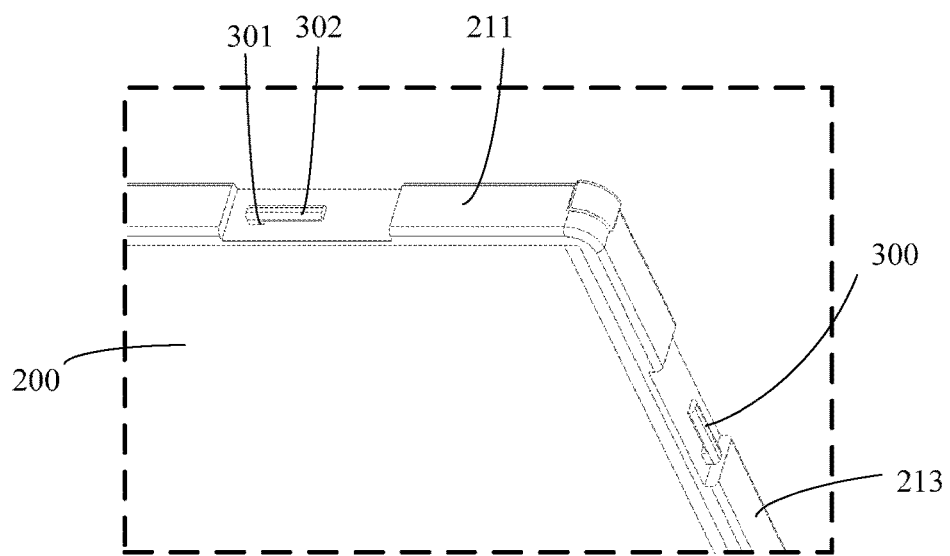
FIG. 5 is a structural schematic diagram of a portion of a frame in the backlight module provided in the embodiments of the present disclosure.
Figure 6:
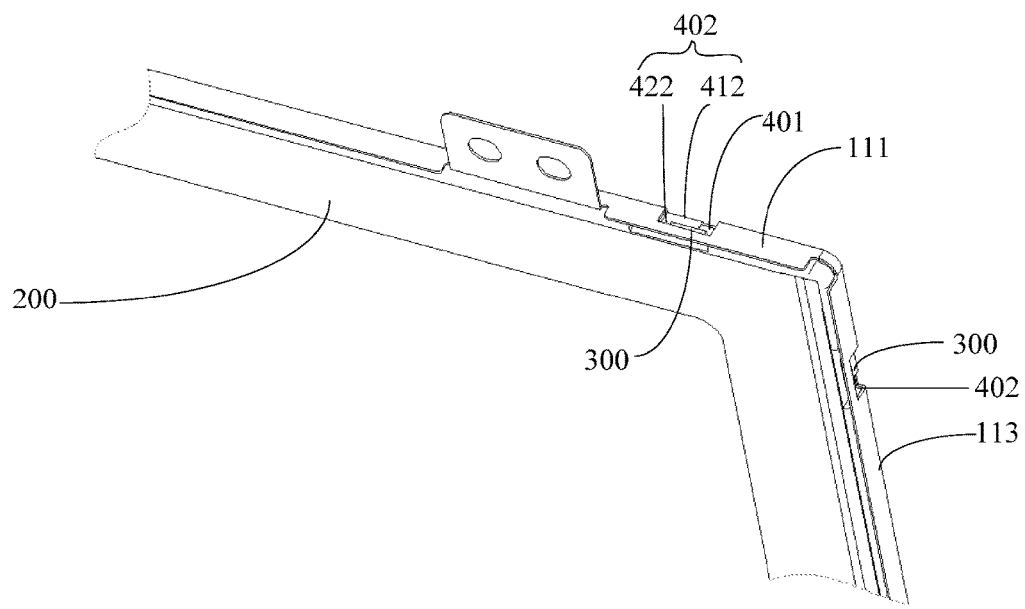
FIG. 6 is a three-dimensional schematic diagram of a clamping structure for the back plate and the frame in the backlight module provided in the embodiments of the present disclosure.

FIG. 5 is a three-dimensional structural schematic diagram of a part of the frame 200 before being assembled in the embodiments of the present disclosure. The frame 200 is at least partially accommodated in the accommodation space defined by the base plate 101 and the side wall, and includes at least one side surface (i.e., a frame outer surface) arranged opposite to the side wall of the back plate 100.

As shown in FIG. 5, a plurality of clamping hooks 300 is arranged on the side surface of the frame 200, and each of the plurality of clamping hooks 300 includes a first portion 301 connected with the side surface of the frame 200 and a second portion 302 formed by bending and extending the first portion 301.

Figure 4:
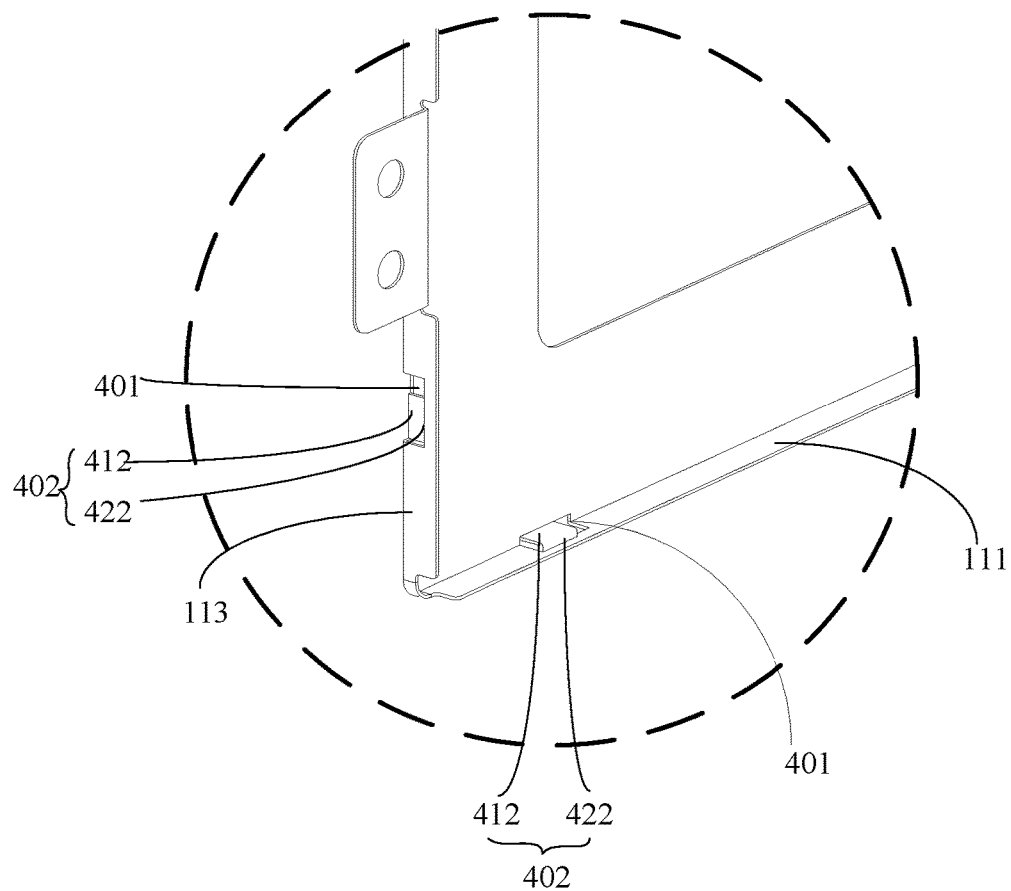
FIG. 4 is an enlarged structural schematic diagram of a "A" portion in FIG. 3.

FIG. 4 is an enlarged structural schematic diagram of a "A" portion in the back plate shown in FIG. 3. As shown in FIG. 3 and FIG. 4, a plurality of matching parts corresponding to the plurality of clamping hooks 300 is formed on the sidewall of the back plate 100.

Figure 10:
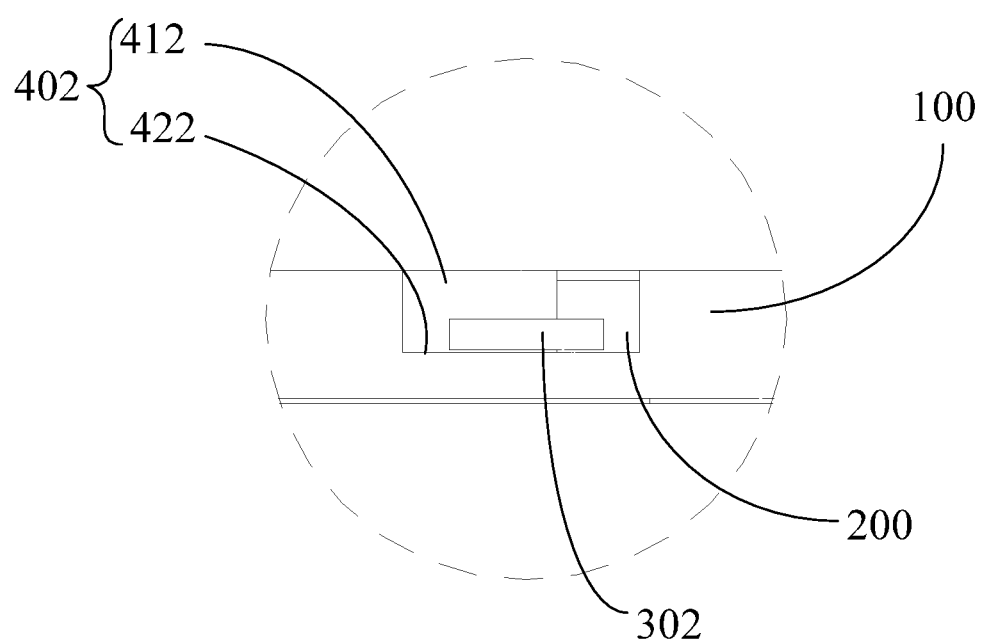
FIG. 10 is an enlarged schematic diagram of a "D" portion of the clamping structure in FIG. 9.
Figure 11:
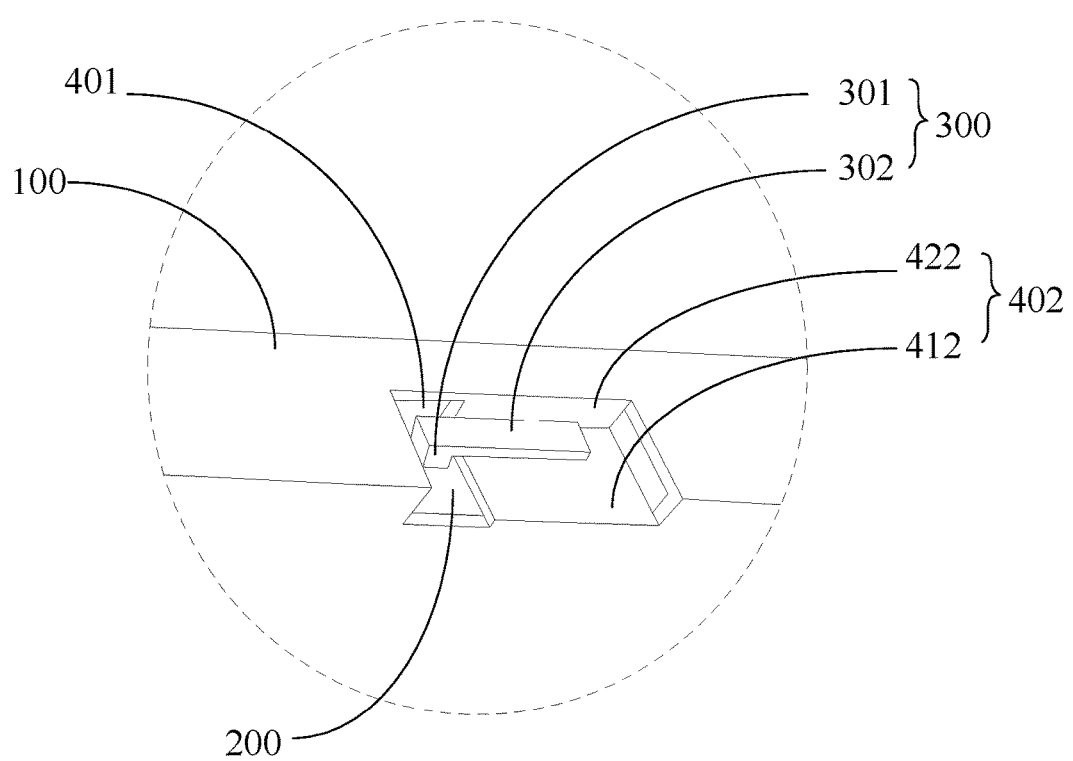
FIG. 11 is a schematic diagram of a structure formed after a matching part on the back plate is clamped with a clamping hook on the frame in the backlight module provided in the embodiments of the present disclosure.

In order to illustrate the present disclosure more clearly, as shown in FIG. 4 (which is a three-dimensional schematic diagram of a part of the back plate before being assembled) and FIG. 11 (which is a schematic diagram of a part of the back plate and the frame after being assembled), each of the plurality of matching parts includes a hook hole portion 401 and a retainer portion 402 around the hook hole portion 401. As shown in FIG. 6, FIG. 8, FIG. 10 and FIG. 11, the first portion 301 of each of the plurality of clamping hooks 300 is inserted into the hook hole portion 401, and the second portion 302 of the clamping hook is clamped with the retainer portion 402.

In the embodiments of the present disclosure, the backlight module is provided with the plurality of clamping hooks 300 on the frame 200 and the plurality of matching parts on the back plate 100, wherein each clamping hook 300 is formed of the first portion 301 and a second portion 302, and a bending structure is formed between the first portion 301 and the second portion 302. When assembling the frame and the back plate, the frame 200 is placed into the accommodation space of the back plate 100. After each clamping hook 300 on the frame 200 is inserted through the hook hole portion 401 of the corresponding matching part on the back plate 100, the back plate 100 is pushed in a direction opposite to the bending and extending direction of the second portion 302. In this way, the second portion 302 of each clamping hook 300 may be clamped by and fixed with the retainer portion 402 of the corresponding matching part, and an assembling process is completed. FIG. 7 shows a three-dimensional structural schematic diagram of a backlight module formed after assembling the frame and the back plate.

In case that the above assembled backlight module is subject to repair, the back plate 100 is pushed in the bending and extending direction of the second portion 302, and then the clamping hook 300 is taken out off the hook hole portion 401, thereby disassembling the backlight module.

In view of the above, the backlight module provided by the present disclosure may be assembled and disassembled in a simpler manner as compared with the backlight module in the related arts, and thus it enables to improve the efficiency of assembling and repairing the display products. Further, because the backlight module provided by at least some embodiments of the present disclosure uses a bending structure of the clamping hook 300, such that the clamping hook 300 is clamped by and fixed with the matching part on the back plate 100. Such clamping structure is more secure as compared with the clamping structure in the related arts in which the protrusion is pressed to deform and clamp. The phenomenon of clamping-escape may be prevented from occurring and the fragments of the frame 200 may be refrained from being generated.

It should be noted that in above and following descriptions, the frame 200 may be a conventional frame or may be a plastic frame that is elastic deformable.

Optional examples of the backlight module provided in the present disclosure will be discussed hereinafter.

Optionally, in the embodiments provided in the present disclosure, a size of each hook hole portion 401 may satisfy a requirement that the first portion 301 of the corresponding clamping hook 300 may move within the hook hole portion in the extending direction of the second portion 302, such that when assembling the back plate 100 and the frame 200, the first portion 301 of each clamping hook 300 moves within the hook hole portion 401 after being inserted through the hook hole portion 401, and thus the second portion 302 is clamped by and fixed with the retainer portion 402.

FIG. 5 is a three-dimensional structural schematic diagram of a part of the frame in the backlight module provided in the embodiments of the present disclosure. In the embodiments of the present disclosure, optionally, each clamping hook 300 on the frame 200 is of an L-shaped structure formed by bending and extending the first portion 301 to form the second portion 302.

Further optionally, the clamping hooks 300 and the frame 200 is of an integral structure.

Utilizing the above technical solution, the clamping hook is the L-shape clamping hook, and an indentation is formed between the L-shape clamping hook and the frame 200. When assembling the backlight module, referring to FIGS. 4-6, 8-9, the second portion 302 of the L-shape clamping hook may be inserted into and extend through the hook hole portion 401 on the back plate 100, and then the retainer portion 402 on the back plate 100 may be clamped in the indentation formed between the L-shape clamping hook and the side surface of the frame 200, thus implementing the clamping structure.

It should be understood that a specific structure of the clamping hook 300 is not limited thereto.

In addition, in the backlight module provided in the embodiments of the present disclosure, the second portions 302 of the plurality of clamping hooks 300 on the same side surface of the frame 200 have the same bending and extending direction, and the retainer portions of the plurality of matching parts on the same sidewall of the back plate 100 are located on the same side of the hook hole portions 401 respectively and correspond to positions of the second portions 302 of the corresponding clamping hooks 300 respectively.

In the above technical solutions, the second portions 302 of the plurality of clamping hooks 300 on the same side surface of the frame 200 have the same bending and extending direction, i.e., the indentations formed between the L-shape clamping hooks on the same side surface of the frame 200 and the side surface of the frame 200 have the same orientation. Thus, when assembling the backlight module, the L-shape clamping hooks on the same side surface may push the back plate 100 in the same direction, so as to implement the clamping structure, and thus facilitating the assembling.

Additionally, in the backlight module provided in the embodiments of the present disclosure, as shown in FIG. 3 and FIG. 4, the back plate 100 includes a first sidewall 111, a second sidewall 112 that is arranged opposite to the first sidewall 111, and a third sidewall 113 connected between the first sidewall 111 and the second sidewall 112. As shown in FIG. 5, the frame 200 includes a first side surface 211 arranged opposite to the first sidewall 111, a second side surface arranged opposite to the second sidewall, and a third side surface 213 arranged opposite to the third sidewall 113.

As shown in FIG. 5, on the first side surface 211 and the second side surface, the second portion 302 of each clamping hook 300 bends and extends towards the direction of the third side surface 213, and on the third side surface 213, the second portion 302 of each clamping hook 300 bends and extends towards the first side surface 211 or the second side surface.

In the backlight module provided by the present disclosure, as shown in FIG. 3 and FIG. 7, one side of the back plate 100 is used for installation of light bars, and the side used for the installation of light bars is not provided with a side wall, but is used as an insertion side of the frame 200 at the time of assembling. The clamping hooks 300 are arranged on the side surfaces corresponding to the remaining three sidewalls of the back plate 100, wherein the indentations of multiple L-shape clamping hooks corresponding to the third sidewall 113 arranged opposite to the insertion side face the first sidewall 111 or the second sidewall, and the indentations of multiple L-shape clamping hooks on the first side surface 111 and the second side surface corresponding to the first sidewall 111 and the second sidewall face the insertion side at the time of assembling, i.e., facing a direction away from the third sidewall 113. When assembling the backlight module, the frame 200 is inserted into the accommodation space in the back plate 100 from the insertion side of the back plate 100. Firstly, the first sidewall 111 of the back plate 100 and the first side surface 211 of the frame 200 are to be assembled together, and the second sidewall of the back plate 100 and the second side surface of the frame 200 are to be assembled together, wherein all clamping hooks 300 on the first side surface 211 and the second side surface of the frame 200 are made to be aligned with the corresponding matching parts on the back plate 100; after the clamping hooks are inserted into and extend through the hook hole portions 401, the back plate 100 is pushed in a direction opposite to the direction in which the second portion 302 of each clamping hook 300 bends and extends, until the clamping hooks and the matching parts are fitted tightly. Then, the third outer fame surface 213 of the frame 200 and the third sidewall 113 of the back plate 100 are to be assembled, wherein, by using elasticity of the frame 200 per se, the third side surface 213 of the frame 200 is lifted slightly towards the direction in which the second portion 302 of each clamping hook 300 on the third side surface 213 bends and extends, such that all of the clamping hooks 300 on the third side surface 213 of the frame 200 are clamped into the matching parts of the back plate 100.

It should be noted that the above technical solution provides an example of the directions of the indentations of the clamping hooks 300 on each side surface of the frame 200. It may be understood that, in practice, the directions of the indentations of the clamping hooks 300 on each side surface of the frame 200 are not limited thereto. For example, the clamping hooks 300 on each side surface of the frame 200 may face the base plate 101 of the back plate 100, or face the display panel.

Additionally, in the backlight module provided by the embodiments of the present disclosure, optionally, as shown in FIGS. 4, 6, 8, 10 and 11, the retainer portion 402 includes a first retainer 412 parallel to the side surface of the frame 200, and a second retainer 422 vertical to the side surface of the frame 200 and parallel to the direction in which the second portion 302 extends.

The first retainer 412 is arranged between the second portion 302 and the side surface of the frame 200, and is used to position the clamping hook 300 in the direction in which the second portion 302 extends and in the direction vertical to the side surface of the frame 200. The second retainer 422 is arranged on a side of the second portion 302 that is close to or away from the base plate 101 of the back plate 100, and is used to position the clamping hook 300 in a direction vertical to the base plate 101.

With the above technical solution, the matching parts on the back plate 100 are clamped with the clamping hooks on the frame 200 by the first retainer 412 and the second retainer 422, and the clamping hooks 300 may be positioned in the extending direction of the second portion 302 (X direction), in the direction vertical to the side surface of the frame 200 (Y direction), and in the direction vertical to the base plate 101 (Z direction).

Optionally, as shown in FIG. 4, FIG. 10 and FIG. 11, each of the matching parts is of a groove structure formed by stamping the sidewall of the back plate 100, and the groove structure is depressed in a direction towards the frame 200 and includes a groove bottom and a groove wall, wherein the first retainer 412 is defined by the groove bottom, and the second retainer 422 is defined by the groove wall, and the hook hole portion 401 is arranged at the groove bottom.

Using the above technical solution, the groove structure is directly formed by the stamping sidewalls of the back plate 100, and the hook hole portion 401 is formed at the groove bottom of the groove structure. Thus, when assembling the backlight module, the second portion 302 of each clamping hook 300 on the frame 200 protrudes from the side surface of the frame 200, and the groove bottom of the groove structure is concave in the sidewalls of the back plate 100, so as to facilitate the clamping hook 300 of the frame 200 to be clamped into the hook hole portion 401 at the time of assembling the backlight module, and because the first retainer 412 and the second retainer 422 are formed of the groove bottom and the groove walls, respectively, such structure is simple and easy to be manufactured.

Of course, it should be understood that, the above only provides an optional structure of the matching parts on the back plate 100, and the structure of the matching parts is not limited thereto.

Additionally, when assembling the back plate 100 and the frame 200, after the first sidewall 111 and the second sidewall of the back plate 100 are mounted with the first side surface 211 and the second side surface of the frame 200, the third sidewall 113 of the back plate 100 is clamped with the third side surface 213 of the frame 200. At this time, the frame 200 is required to be lifted slightly towards the first sidewall 111 or the second sidewall of the back plate 100, such that the clamping hooks 300 on the frame 200 may be clamped into the hook hole portions 401 on the third sidewall 113 of the back plate 100. Thus, in the backlight module provided in the embodiments of the present disclosure, optionally, there is a predetermined distance between the second portion 302 of each clamping hook 300 and the side surface of the frame 200, and the predetermined distance is greater than a thickness of the first retainer 412.

With the above technical solution, because there is the predetermined distance between the second portion 302 of each clamping hook 300 and the side surface of the frame 200, when assembling the third sidewall 113 of the back plate 100 with the third side surface 213 of the frame 200, it facilitates to clamp the clamping hooks 300 on the third frame surface 213 of the frame 200 with the hook hole portions 401 on the third sidewall 113 of the back plate 100.

Additionally, in the present embodiment, optionally, a length of each clamping hook 300 of the frame 200 in the extending direction of the second portion 302 is about 3 mm, and a length of each matching part of the back plate 100 in the extending direction of the second portion 302 is about 7 mm. It is preferred that the length of the matching part is slightly greater than twice of the length of the clamping hook 300. A distance between the second portion 302 of each clamping hook 300 on the frame 200 and the bottom of each matching part on the back plate 100 is about 0.25-0.3 mm, which is slightly greater than a thickness of a sheet metal of the back plate 100 (the thickness of the sheet metal of the back plate 100 is about 0.2 mm).

It should be understood that, the above is merely an optional embodiment, and the sizes of the clamping hook 300 and the matching part are not limited thereto.

Additionally, the embodiments of the present disclosure further provide a display module including the above backlight module. The display module may include a liquid crystal display, a liquid crystal television, a mobile terminal device, a wearable device, and the like.

The above are merely the preferred embodiments of the present disclosure. A person skilled in the art may make further modifications and improvements without departing from principle and spirit of the present disclosure, and these modifications and improvements shall also fall within the scope of the present disclosure.

What is claimed is:

1. A backlight module, comprising:
a back plate comprising a base plate and at least one side wall, wherein an accommodation space is defined by the base plate and the side wall together;
a frame, at least a portion of which is accommodated in the accommodation space defined by the base plate and the side wall, wherein the frame comprises at least one side surface arranged opposite to the at least one side wall of the back plate;
wherein a plurality of clamping hooks is arranged on the side surfaces of the frame, and a plurality of matching parts is arranged on the side wall of the back plate and in one-to-one correspondence with the plurality of clamping hooks; each of the clamping hooks comprises a first portion connected to the side surface of the frame and a second portion formed by bending and extending the first portion, and each of the matching parts comprises a hook hole portion and a retainer portion arranged around the hook hole portion; the first portion of each clamping hook is capable of being inserted into the hook hole portion of the corresponding matching part, such that the second portion of the clamping hook is clamped by and fixed with the retainer portion of the corresponding matching part;
the retainer portion comprises a first retainer arranged parallel to a side surface of the frame, and a second retainer arranged vertical to the side surface of the frame and parallel to an extending direction of the second portion of the corresponding clamping hook; and
the first retainer is arranged between the second portion of the corresponding clamping hook and the side surface of the frame, and configured to position the corresponding clamping hook in the extending direction of the second portion and in a direction vertical to the side surface of the frame; the second retainer is arranged on a side of the second portion of the corresponding clamping hook that is close to or away from the base plate of the back plate, and configured to position the corresponding clamping hook in a direction vertical to the base plate.

2. The backlight module according to claim 1, wherein
the second portions of the clamping hooks on a same side surface of the frame have a same bending and extending direction; and
in the matching parts on the same side wall of the back plate, the retainer portions are arranged at a same side of the respective hook hole portions, and correspond to respective locations of the second portions of corresponding clamping hooks.

3. The backlight module according to claim 1, wherein
the back plate comprises a first sidewall, a second sidewall arranged opposite to the first sidewall, and a third sidewall connected between the first sidewall and the second sidewall, and the frame comprises a first side surface corresponding to the first sidewall, a second side surface corresponding to the second sidewall, and a third side surface corresponding to the third sidewall;
wherein the second portions of the clamping hooks on the first side surface and the second side surface are in a bending and extending direction away from the third side surface, and the second portions of the clamping hooks on the third side surface are in a bending and extending direction towards the first side surface or the second side surface.

4. The backlight module according to claim 1, wherein each of the matching parts is of a groove structure formed by stamping a sidewall of the back plate, and the groove structure is depressed in a direction towards the frame and comprises a groove bottom and a groove wall, wherein the first retainer is defined by the groove bottom, and the second retainer is defined by the groove wall, and the hook hole portion is arranged at the groove bottom.

5. The backlight module according to claim 1, wherein there is a predetermined distance between the second portion of each clamping hook and the side surface of the frame, and the predetermined distance is greater than a thickness of the first retainer of the corresponding matching part.

6. The backlight module according to claim 1, wherein the first portion of each of the clamping hooks is movable within the hook hole portion of the corresponding matching part in the extending direction of the second portion of the clamping hook, such that in the case of assembling the back plate and the frame, the first portion of the clamping hook moves within the hook hole portion after the first portion of the clamping hook is inserted into the hook hole portion, enabling the second portion to be clamped by and fixed with the retainer portion.

7. The backlight module according to claim 1, wherein each of the clamping hooks is of an L-shaped structure consisting of the first portion and the second portion.

8. The backlight module according to claim 1, wherein the clamping hooks and the frame is of an integral structure.

9. A display device comprising the backlight module according to claim 1.

10. The display device according to claim 9, wherein
the second portions of the clamping hooks on a same side surface of the frame have a same bending and extending direction; and
in the matching parts on the same side wall of the back plate, the retainer portions are arranged at a same side of the respective hook hole portions, and correspond to respective locations of the second portions of corresponding clamping hooks.

11. The display device according to claim 9, wherein
the back plate comprises a first sidewall, a second sidewall arranged opposite to the first sidewall, and a third sidewall connected between the first sidewall and the second sidewall, and the frame comprises a first side surface corresponding to the first sidewall, a second side surface corresponding to the second sidewall, and a third side surface corresponding to the third sidewall;
wherein the second portions of the clamping hooks on the first side surface and the second side surface are in a bending and extending direction away from the third side surface, and the second portions of the clamping hooks on the third side surface are in a bending and extending direction towards the first side surface or the second side surface.

12. The display device according to claim 9, wherein each of the matching parts is of a groove structure formed by stamping a sidewall of the back plate, and the groove structure is depressed in a direction towards the frame and comprises a groove bottom and a groove wall, wherein the first retainer is defined by the groove bottom, and the second retainer is defined by the groove wall, and the hook hole portion is arranged at the groove bottom.

13. The display device according to claim 9, wherein there is a predetermined distance between the second portion of each clamping hook and the side surface of the frame, and the predetermined distance is greater than a thickness of the first retainer of the corresponding matching part.

14. The display device according to claim 9, wherein the first portion of each of the clamping hooks is movable within the hook hole portion of the corresponding matching part in the extending direction of the second portion of the clamping hook, such that in the case of assembling the back plate and the frame, the first portion of the clamping hook moves within the hook hole portion after the first portion of the clamping hook is inserted into the hook hole portion, enabling the second portion to be clamped by and fixed with the retainer portion.

15. The display device according to claim 9, wherein each of the clamping hooks is of an L-shaped structure consisting of the first portion and the second portion.

16. The display device according to claim 9, wherein the clamping hooks and the frame is of an integral structure.

* * * * *

UNITED STATES PATENT AND TRADEMARK OFFICE
CERTIFICATE OF CORRECTION

PATENT NO. : 10,139,555 B2
APPLICATION NO. : 15/309150
DATED : November 27, 2018
INVENTOR(S) : Xing Wang et al.

It is certified that error appears in the above-identified patent and that said Letters Patent is hereby corrected as shown below:

On the Title Page

Item (73) Assignees:
After "HEFEI BOE DISPLAY"
Delete "LIGHT" and
Insert -- LIGHTING --.

Signed and Sealed this
Fourteenth Day of May, 2019

Andrei Iancu
*Director of the United States Patent and Trademark Office*